Patented May 12, 1931

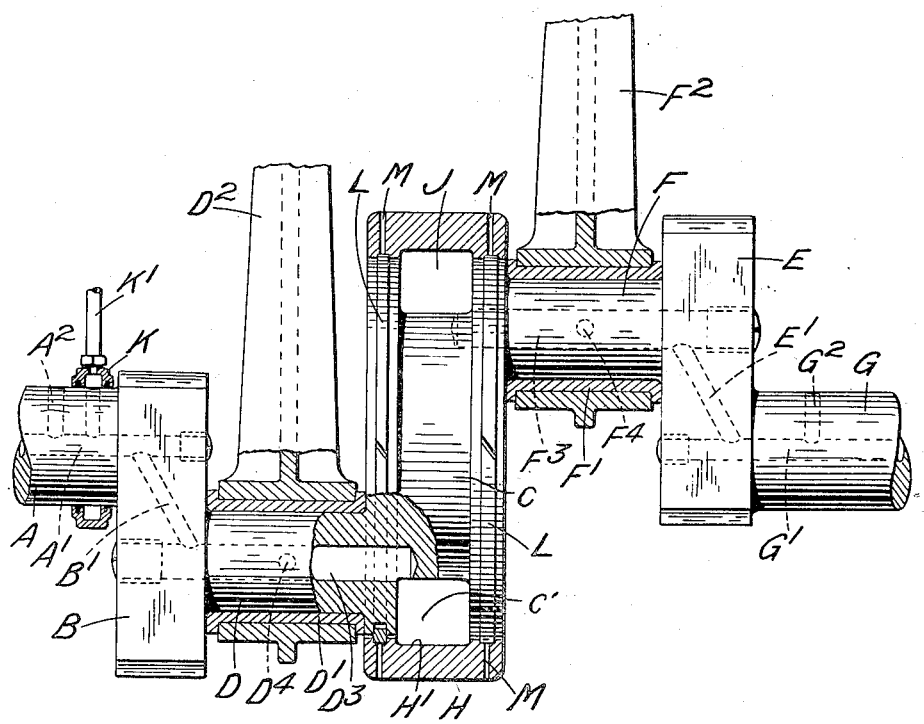

1,804,643

UNITED STATES PATENT OFFICE

HARRY RALPH RICARDO, OF LONDON, ENGLAND

CRANKSHAFT

Application filed February 20, 1930, Serial No. 430,099, and in Great Britain April 2, 1929.

This invention relates to crankshafts for fluid pressure engines, pumps or compressors, of the kind wherein, in order to damp out torsional oscillations in the crankshaft, one or more of the crank webs is of circular cross-section in a plane at right angles to the crankshaft axis and has associated therewith an annular inertia mass member mounted so as to be capable of rotational movement on the web about the crankshaft axis and in frictional contact with the crank web, this mass member acting as a torsional oscillation damper for the crankshaft.

The object of the invention is to provide an improved crankshaft assembly of the above kind wherein lubricating oil is circulated through passages in the crankshaft.

According to the present invention the annular inertia member and the crankshaft are so constructed that an annular groove is provided between the crank web and the inertia member which surrounds it, through which groove the lubricating oil is caused to flow so that the apparatus acts as a centrifugal separator for the oil tending to cause impurities therein to be thrown outwards against the inner circumferential surface of the inertia member.

In any case, where a crank web of circular form is employed with an annular inertia member surrounding it as described above, the frictional contact between the web and the inertia member is conveniently effected by one or more spring rings interposed between these members, the spring rings being disposed on each side of this groove so as to act as sealing rings to prevent escape of oil therefrom in addition to effecting the frictional contact between the crank web and the inertia member.

With such an arrangement the pressure of the oil may be relied upon alone or in conjunction with spring pressure derived either from the rings themselves or from one or more separate springs, to force the rings against the sides of their grooves and the inner circumferential surface of the inertia member and thus provide the necessary frictional contact between the parts. Further, means such as pegs may be provided to prevent rotation of the rings relatively to the crank web.

It is to be understood that other means may be provided to effect the frictional contact between the crank web and the inertia mass or to prevent leakage of oil from the oil groove either instead of or in addition to the spring rings referred to above.

The invention may be carried into practice in various ways but one construction according to this invention is illustrated by way of example in side elevation partly in section in the accompanying drawing.

In the construction illustrated, the crankshaft to which the invention is applied is of the multi-throw type, only two of the cranks being shown, however, for the sake of convenience. The portion of the crankshaft illustrated comprises a shaft length A adapted to be supported in a main bearing (not shown) and carrying a crank web B between which and a flying crank web C extends a crank pin D adapted to be engaged by the bearing $D^1$ or the lower end of a connecting rod $D^2$. Extending between the flying web C and a further crank web E is a second crank pin F to which is adapted to be connected by a bearing $F^1$ a connecting rod $F^2$. The crank web E is connected to a second shaft length G adapted to be supported in a main bearing in the crank case.

The flying web C which is symmetrical about the crankshaft axis and of circular cross-section in a plane at right angles to such axis is surrounded by an annular inertia member H of appreciable mass so mounted on the web as to be capable of rotating therewith or relatively thereto about the axis of rotation of the crankshaft.

The crank web C is provided with a circumferential groove $C^1$ and an internal circumferential groove $H^1$ is also preferably provided in the inner wall of the inertia mass member H, these grooves together forming an annular passage J through which oil is adapted to flow from an oil passage $D^3$ in the crank pin D to a substantially diametrically opposite oil passage $F^3$ in the crank pin F, these oil passages $D^3$, $F^3$, and the annular chamber J constituting part of a complete system of passages in the crankshaft through which oil is caused to flow so as to deliver oil to the main and connecting rod bearings. Thus the shaft length A is provided with a passage $A^1$ to which oil is supplied through a slip ring K from a pipe $K^1$ and from which it flows through a further passage $B^1$ in the crank web to the passage $D^3$ in the crank pin D. From this passage it flows as described above through the annular chamber J into the passage $F^3$ in the other crank pin F and thence through a further passage $E^1$ in the crank web E to a passage $G^1$ in the shaft length G, radial passages $A^2$, $D^4$, $F^4$ and $G^2$ being provided in the shaft lengths A and G and the crank pins D and F for delivering oil to the bearings surrounding them. The lubricating system is preferably of the type wherein oil is circulated under pressure continuously through the crankshaft.

Arranged on each side of the annular chamber J and so as each to lie partly in an external circumferential groove in the crank web C and partly in an internal circumferential groove in the inertia member H is a spring ring L similar in form to a piston ring. These rings not only effect frictional contact between the crank web C and the inertia member H and serve as sealing rings to prevent the escape of oil through the spaces on each side of the annular oil chamber J, but also locate the inertia member H axially on the crank web.

The groove in the inertia member H in which the outer circumferential part of each ring L lies is preferably provided with a series of radial holes M extending therefrom to the outer surface of the inertia member, as shown, so as to permit the insertion of pins to effect the contraction of the ring L when it is desired to remove the inertia member from the crank web.

In the construction illustrated the oil pressure within the chamber J will tend to force the rings against the sides of their grooves in the web C and inertia member H so as to increase the friction between each ring and these members. In some cases, however, one or more springs may be arranged so as to press the rings into contact with the sides of their grooves, such an arrangement being applicable either to an arrangement such as that described above wherein the oil pressure exerts a side thrust on the rings or to similar arrangements according to this invention wherein oil is not circulated through the crank web, or if so circulated does not act on the spring rings.

It will be seen that the apparatus above described will not only act as a torsional oscillation damper for the crankshaft by reason of the frictional contact between the crank web and the inertia member, but further that it will act as a centrifugal separator for the oil flowing through the crankshaft, any solid particles therein tending to be thrust outwards into the groove $H^1$ in the inner circumferential surface of the inertia member H.

It is to be understood that, although the invention has been described with particular reference to its application to a "flying" crank web it may be applied to other crank webs and to crankshafts having different numbers of cranks and either having oil circulated therethrough or not. Further, the invention may be applied to one or more crank webs of a multi-throw crankshaft and the form of the crank webs and the inertia member and the manner in which frictional contact between them is effected may be varied without departing from this invention.

What I claim as my invention and desire to secure by Letters Patent is:—

1. In a crankshaft having a passage for lubricating oil therethrough the combination of a crank web of circular cross-section in a plane at right angles to the crankshaft, an annular inertia member mounted on the web and capable of rotational movement thereon about the crankshaft axis, the inertia member and crank web having grooves so formed as to provide an annular chamber between these two parts into which chamber the lubricating oil can flow in its passage through the crankshaft whereby the apparatus acts as a centrifugal separator for the oil tending to cause impurities therein to be thrown outwards against the inner circumferential surface of the inertia member, and means for frictionally connecting the inertia member to the crank web.

2. In a crankshaft having a passage for lubricating oil therethrough the combination of a crank web of circular cross-section in a plane at right angles to the crankshaft axis, an annular inertia member mounted on the crank web and capable of rotational movement thereon about the crankshaft axis, the inertia member and crank web having grooves so formed as to provide an annular chamber between them into which chamber the lubricating oil can flow in its passage through the crankshaft, and at least one spring ring disposed on each side of the annular groove serving not only as sealing rings to prevent leakage of oil from such groove but also to establish frictional contact between the crank web and inertia member.

In testimony whereof I have signed my name to this specification.

HARRY RALPH RICARDO.